US007164787B1

United States Patent
Nevis et al.

(10) Patent No.: US 7,164,787 B1
(45) Date of Patent: Jan. 16, 2007

(54) ENHANCING TWO-DIMENSIONAL CONTRAST IMAGES RENDERED FROM THREE-DIMENSIONAL STREAK TUBE IMAGING LIDAR (STIL) DATA

(75) Inventors: Andrew J. Nevis, Panama City, FL (US); James F. Bryan, Lynn Haven, FL (US); Brett W. Cordes, Panama City Beach, FL (US); James S. Taylor, Panama City Beach, FL (US); Mary C. Hulgan, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 771 days.

(21) Appl. No.: 10/609,899

(22) Filed: Jun. 26, 2003

(51) Int. Cl.
  *G06K 9/00* (2006.01)
  *G06K 9/40* (2006.01)
  *G06K 9/36* (2006.01)

(52) U.S. Cl. .................. 382/154; 382/254; 382/274; 382/285; 345/419; 356/12; 348/42; 359/462

(58) Field of Classification Search ................ 382/154, 382/254, 274, 285; 345/419–427; 356/12–14; 348/42–60; 359/462–477
See application file for complete search history.

(56) References Cited

U.S. PATENT DOCUMENTS

| 5,467,122 | A  | * | 11/1995 | Bowker et al. ............... 348/31 |
| 5,600,574 | A  | * | 2/1997  | Reitan ........................ 702/185 |
| 6,400,396 | B1 | * | 6/2002  | Bowker et al. ............... 348/81 |
| 6,836,285 | B1 | * | 12/2004 | Lubard et al. ................ 348/31 |
| 6,928,194 | B1 | * | 8/2005  | Mai et al. .................... 382/284 |
| 6,970,578 | B1 | * | 11/2005 | Strand ........................ 382/103 |
| 2004/0031906 | A1 | * | 2/2004 | Glecker ................... 250/208.1 |
| 2004/0119838 | A1 | * | 6/2004 | Griffis et al. ............ 348/215.1 |
| 2006/0132752 | A1 | * | 6/2006 | Kane ........................ 356/5.02 |

* cited by examiner

*Primary Examiner*—Jingge Wu
*Assistant Examiner*—Aaron Carter
(74) *Attorney, Agent, or Firm*—James T. Shepherd

(57) ABSTRACT

A method is provided for enhancing two-dimensional contrast images rendered from three-dimensional STIL data. Briefly, the rendered contrast image data is scaled based on a mean intensity value of all pixels of data therein, stretched to a predetermined dynamic range, modified to compensate for jitter and CCD array effects associated with the STIL camera system, normalized using an exponential decay function that describes contrast intensity roll-off associated therewith, and has a histogram clip routine applied thereto.

10 Claims, 4 Drawing Sheets

ENHANCING TWO-DIMENSIONAL CONTRAST IMAGES RENDERED FROM THREE-DIMENSIONAL STREAK TUBE IMAGING LIDAR (STIL) DATA

ORIGIN OF THE INVENTION

The invention described herein was made in the performance of official duties by an employee of the Department of the Navy and may be manufactured, used, licensed by or for the Government for any governmental purpose without payment of any royalties thereon.

CROSS-REFERENCE TO RELATED PATENT APPLICATIONS

This patent application is co-pending with one related patent application entitled "ENHANCING TWO-DIMENSIONAL CONTRAST AND RANGE IMAGES RENDERED FROM THREE-DIMENSIONAL STREAK TUBE IMAGING LIDAR (STIL) DATA" (Navy Case No. 84491), by the same inventor as this patent application.

FIELD OF THE INVENTION

The invention relates generally to image data processing, and more particularly to a method for enhancing two-dimensional contrast images for visual display and/or for use by automatic target recognition schemes where the two-dimensional images have been rendered from three-dimensional streak tube imaging lidar (STIL) data.

BACKGROUND OF THE INVENTION

Streak Tube Imaging Lidar (STIL) is used for the imaging and detection of targets in a turbid medium such as water or air. In terms of imaging an underwater region, STIL systems use a pulsed fan beam to illuminate a thin strip on the ocean bottom that corresponds to a single (cross-track) line in the rendered imagery. Photon returns of the ocean bottom and corresponding adjacent water column are captured in a charge coupled device (CCD) array, essentially capturing a thin volumetric slice, or shot of the ocean in terms of volumetric pixels or voxels as they are known. Each pixel can be represented by a temporal profile which contains an approximate Gaussian shaped curve of the bottom return.

The three-dimensional nature of STIL data yields large data files which require relatively large amounts of time to process and/or transmit. Accordingly, the three-dimensional STIL data is often rendered into two-dimensional forms thereof. In general, STIL data can be rendered into two-dimensional contrast and range maps by finding the peak value of the temporal profile of each pixel. The magnitude of the peak value corresponds to the contrast and the location of the peak value corresponds to the range.

Current methods of rendering involve searching the temporal profile for a matched Gaussian curve fit. However, this technique is limited in that the prior estimates of the Gaussian curve width must be known. That is, problems arise when the true width of the Gaussian curve in the temporal profile is different from the fitted width. In addition, prior to the Gaussian curve match fit, dark field and ambient light fields must be determined and removed from the temporal profile. These rendering methods use a separate dark field file to remove the dark field values and must estimate a $K_{sys}$ value to compute the ambient light field exponential decay curve. However, this means that a separate dark field file must be provided. Also, poor estimates of the $K_{sys}$ value yield poor rendering results.

Another method of rendering is disclosed in U.S. patent application Ser. No. 10/429,330 entitled "RENDERING THREE-DIMENSIONAL STREAK TUBE IMAGING LIDAR (STIL) DATA TO TWO-DIMENSIONAL CONTRAST AND RANGE MAPPINGS THEREOF", filed Apr. 28, 2003. This method involves processing a temporal portion of the STIL data for each pixel of the three-dimensional image. Each temporal portion includes a Gaussian-like portion and non-Gaussian-like portions. Processing for each pixel includes: (i) removing noise from the temporal portion using the non-Gaussian-like portions resulting in the formation of a filtered form of the Gaussian-like portion, (ii) determining a non-integer center of mass of the filtered form of the Gaussian-like portion with the non-integer center of mass being indicative of a range value, and (iii) applying a mathematical interpolation function to determine amplitude of the filtered form of the Gaussian-like portion at the range value defined by the non-integer center of mass. The amplitude so-determined is indicative of a contrast value. The process is repeated for all pixels to thereby produce range and contrast maps.

In general, rendered two-dimensional contrast and range data is subject to the following three effects:
  (1) CCD array effects cause forward direction bands to form in the images (both contrast and range);
  (2) The STIL system's laser experiences jitter, the effects of which cause cross-track direction banding in both the contrast and range images; and
  (3) Intensity roll-off in the cross track direction (multiplicative for contrast and additive for range) from uneven photon path propagation due to the STIL system's wide field-of-view.

The current method for correcting CCD array effects and contrast intensity roll-off involves normalizing the contrast and range maps with the image "column profile" (i.e., an array of average intensity values taken along the columns of pixel data). The contrast map is normalized by dividing the contrast image columns by the (contrast) column profile to correct multiplicative effects associated with contrast data. The range map is normalized by subtracting the (range) column profile from the range image columns to correct additive effects associated with range data. This corrects both the contrast intensity roll-off and the CCD array banding simultaneously. However, the disadvantage of this technique is that substantial shadowing effects occur about objects within the image scene in cluttered environments. This detracts from the enhancement of the image scene and can cause significant problems with automatic target recognition algorithms.

The current method for correcting jitter effects involves normalizing the image rows with the image "row profile" (i.e., an array of average intensity values taken along the rows of pixels of data). The contrast map is normalized by dividing the image rows by the contrast image row profile (to correct multiplicative effects), and the range map is normalized by subtracting the range image profile from the image rows (to correct additive effects from the range image rows). Again, this leads to substantial shadowing effects about objects within the image scene in cluttered environments which, in turn, causes problems with automatic target recognition algorithms.

The current method of enhancement also has significant contrast problems as the image scene changes its background illumination and as the objects within the image scene vary from high contrast to low contrast. This results in either the saturation of high contrast objects so that low contrast objects are visually visible, or the preservation of high contrast objects at the expense of obscuring low contrast objects from visibility.

SUMMARY OF THE INVENTION

Accordingly, it is an object of the present invention to provide a method of enhancing two-dimensional contrast images rendered from STIL data.

Another object of the present invention is to provide for the automated image enhancement of a STIL systems's previously rendered contrast images.

Other objects and advantages of the present invention will become more obvious hereinafter in the specification and drawings.

In accordance with the present invention, a method is provided for enhancing two-dimensional contrast images rendered from three-dimensional streak tube imaging lidar (STIL) data that is generated by a STIL camera system. The rendered contrast image data comprises pixels of data that can be used to form an image. The following sequential steps are applied to the rendered contrast image data:

(i) An intensity value associated with each pixel of data in the rendered contrast image data is scaled based on a mean intensity value of all pixels of data in the rendered contrast image data, wherein first interim contrast image data is created.

(ii) The first interim contrast image data is re-scaled to a predetermined dynamic range, wherein second interim contrast image data is created.

(iii) The second interim contrast image data is modified to compensate for jitter and charge coupled device (CCD) array effects associated with the STIL camera system, wherein third interim contrast image data is created.

(iv) The third interim contrast image data is re-scaled to the predetermined dynamic range, wherein fourth interim contrast image data is created.

(v) The fourth interim contrast image data is normalized using an exponential decay function that describes contrast intensity roll-off associated with the fourth interim contrast image data, wherein fifth interim contrast image data is created.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

As is well known in the art, STIL systems/methods can be used to image turbid air or water regions. The image that is produced using such data is three-dimensional in nature with each elemental portion of the image being defined by a pixel. However, the data is frequently better transmitted and/or viewed in the form of two-dimensional range and contrast maps thereof.

The present invention enhances two-dimensional range and contrast maps rendered from three-dimensional STIL data for improved viewing thereof. The generation of such STIL data can be achieved in accordance with the teachings of, for example, U.S. Pat. Nos. 5,467,122 and 6,400,396. The rendering of three-dimensional STIL data into two-dimensional range and contrast data/images (i.e., the data being convertible into an image representation thereof) can be accomplished in accordance with one of the various rendering techniques described hereinabove in the "Background of the Invention". Accordingly, it is to be understood that the methods/systems used to generate the STIL data and to render same into two-dimensional range and contrast data/images are not limitations of the present invention.

Figure 1:
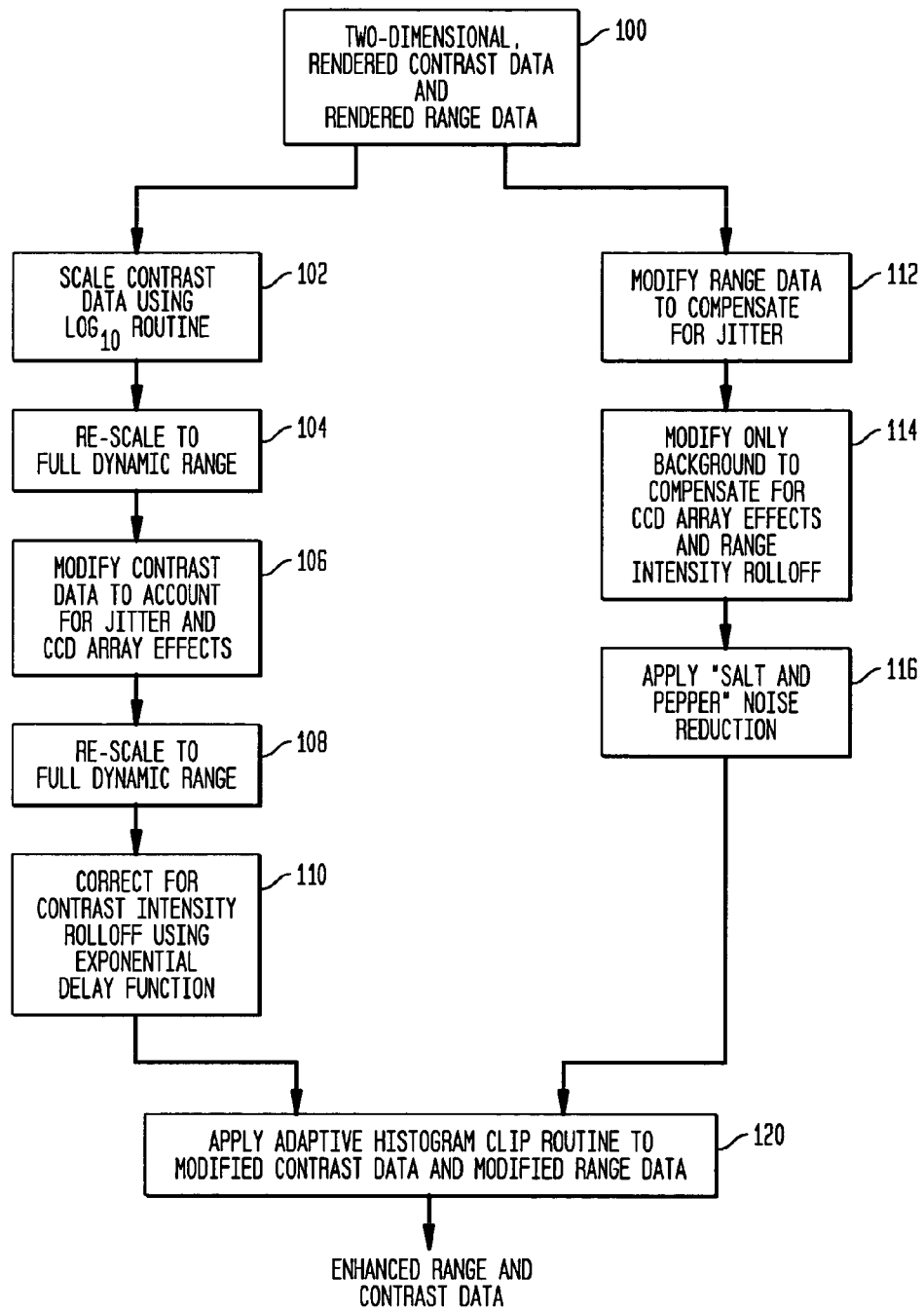
FIG. 1 is a top-level flow diagram of the present invention's method of enhancing two-dimensional range and contrast data/images that have been rendered from three-dimensional STIL data.

Referring now to the drawings, and more particularly to FIG. 1, a top-level flow diagram is shown of the enhancement method of the present invention. It is assumed that three-dimensional STIL data has already been rendered into two-dimensional range and contrast data, both of which are provided at step 100. Depending on the type of STIL system used to generate the original STIL data, various pre and post processing steps (not illustrated in FIG. 1) can be applied to the rendered range and contrast data. Examples of such pre and post processing will be discussed further below.

The present invention provides for enhancement of just rendered contrast data, just rendered range data, or both rendered contrast data and rendered range data. That is, the processing steps described herein as they apply to contrast data are mutually exclusive with respect to the processing steps described herein as they apply to range data. Thus, the teachings present herein could be used solely for contrast data enhancement, solely for range data enhancement, or for both contrast and range data enhancement.

With respect to the processing of the contrast data, step 102 scales the rendered contrast data to improve visualization of low contrast objects appearing in the rendered contrast image. In general, each pixel of data (i.e., elemental piece of data corresponding to an image pixel) has its intensity value adjusted based on a mean intensity value of all the pixels of data making up the rendered contrast image. One suitable scaling routine is a $\log_{10}$ based scaling routine disclosed in detail in U.S. Pat. Nos. 6,097,849 and 6,108,457, the contents of which are hereby incorporated by reference. This $\log_{10}$ based routine incorporates a scaling parameter that is adaptively computed as a function of the mean intensity of the rendered contrast image. Following this scaling operation, the scaled contrast data is re-scaled or stretched at step 104 to the full dynamic range of an imaging device/display (not shown) that will ultimately be used to display the enhanced images. Such re-scaling or stretching is typically accomplished using a linear stretching function as would be well understood by one of ordinary skill in the art.

The contrast data generated at step 104 serves as the input to step 106 which modifies the contrast data to account for jitter and CCD array effects inherent to the STIL system that was used to originally generate the three-dimensional STIL data. While the details of step 106 will be provided further below, it is sufficient at this point in the discussion to point out that the present invention addresses the jitter and CCD array effects as separate and sequential operations, and then separately corrects contrast intensity roll-off (step 110). This is distinguishable from the prior art where contrast intensity roll-off and CCD array effects are treated simultaneously by the same operation which leads to shadowing effects. The modified contrast data output from step 106 is then re-scaled or stretched at step 108 to the full dynamic range of the ultimate imaging device/display.

As mentioned above, the contrast data output from step 108 is next corrected for contrast intensity roll-off. Contrast intensity roll-off is the bell-shaped drop off in image intensity due to the exponential decay of photons. That is, the path length a photon must travel from the edge of a STIL camera's field-of-view is longer than the path length a photon must travel from the center portion of the STIL camera's field-of-view. With intensity roll-off correction, the bell shape is flattened substantially. Step 110 corrects for contrast intensity roll-off by normalizing the contrast data output from step 108 using an exponential decay function that describes the roll-off curve. One such exponential decay function will be described by way of example further below.

With respect to the processing of the range data, step 112 modifies the rendered range data to compensate for jitter effects and step 114 modifies the output of step 112 to compensate for CCD array effects and simultaneously correct range intensity roll-off. While the details of steps 112 and 114 will be provided further below, it is sufficient at this point in the discussion to note that the modification in step 114 omits pixels of data indicative of an object. That is, step 114 only modifies pixels of data indicative of background. In this way, an implicit assumption of a uniform background is accurately met thereby eliminating, or at least significantly reducing, shadowing effects about objects that occur whenever this implicit assumption is not met.

After correcting for jitter, CCD array effects and intensity roll-off in steps 112 and 114, the corrected range data must be further corrected for noise. In general, range data is particularly vulnerable to incorrect peak detections under turbid conditions due to the appearance of speckled white and black dots (i.e., "salt and pepper noise" as it is known) on the far sides of the image's field-of-view. To correct this, a "salt and pepper" noise reduction routine is applied at step 116 to the range data output from step 114 in order to search for isolated pixels of background that stand out from the local background. One such well known "salt and pepper" noise reduction routine is disclosed in "Digital Image Processing, Second Edition", William K. Pratt, John Wiley and sons, Inc., 1991, pages 285–302, the contents of which are hereby incorporated by reference. Briefly, this routine is accomplished by taking the mean and standard deviation values within a (square) local window about each pixel. The mean within this local window is then re-computed using only pixel values that are within one standard deviation of the mean. If the number of pixels within one standard deviation exceeds some percentage (e.g., 70%) of the number of pixels within the local window and the difference between the pixel in question and the re-computed mean is less than a specified threshold (e.g., 10% of the re-computed mean), then the pixel is declared a noise pixel and is replaced with the re-computed mean value.

Each of the resulting contrast data output from step 110 and range data output from step 116 have an adaptive histogram clip routine applied thereto at step 120 to improve contrast of the image scene represented by the data. One such suitable routine is disclosed in "Adaptive Background Equalization and Image Processing Applications", SPIE Proceedings, Vol. 3710, Orlando, Fla., April 1999, the contents of which are hereby incorporated by reference. Briefly, this routine is accomplished using a scheme that tests the distribution spread of potential clip pixels at specified threshold levels. If the spread is determined to be large, then it is assumed that the potential clip pixels are noise pixels and the histogram clip is applied at the initial specified thresholds. If the spread is determined to be small, then it is assumed that the potential clip pixels are object pixels. Under this condition, the threshold values are reduced (made less strong) until the distribution spread becomes large where it is assumed that those potential clip pixels are noise pixels. The adaptive histogram clip is applied to both the upper histogram region and the lower histogram region of the STIL system's dynamic range. The output of step 120 is the enhanced two-dimensional range and contrast data/images.

Figure 2:
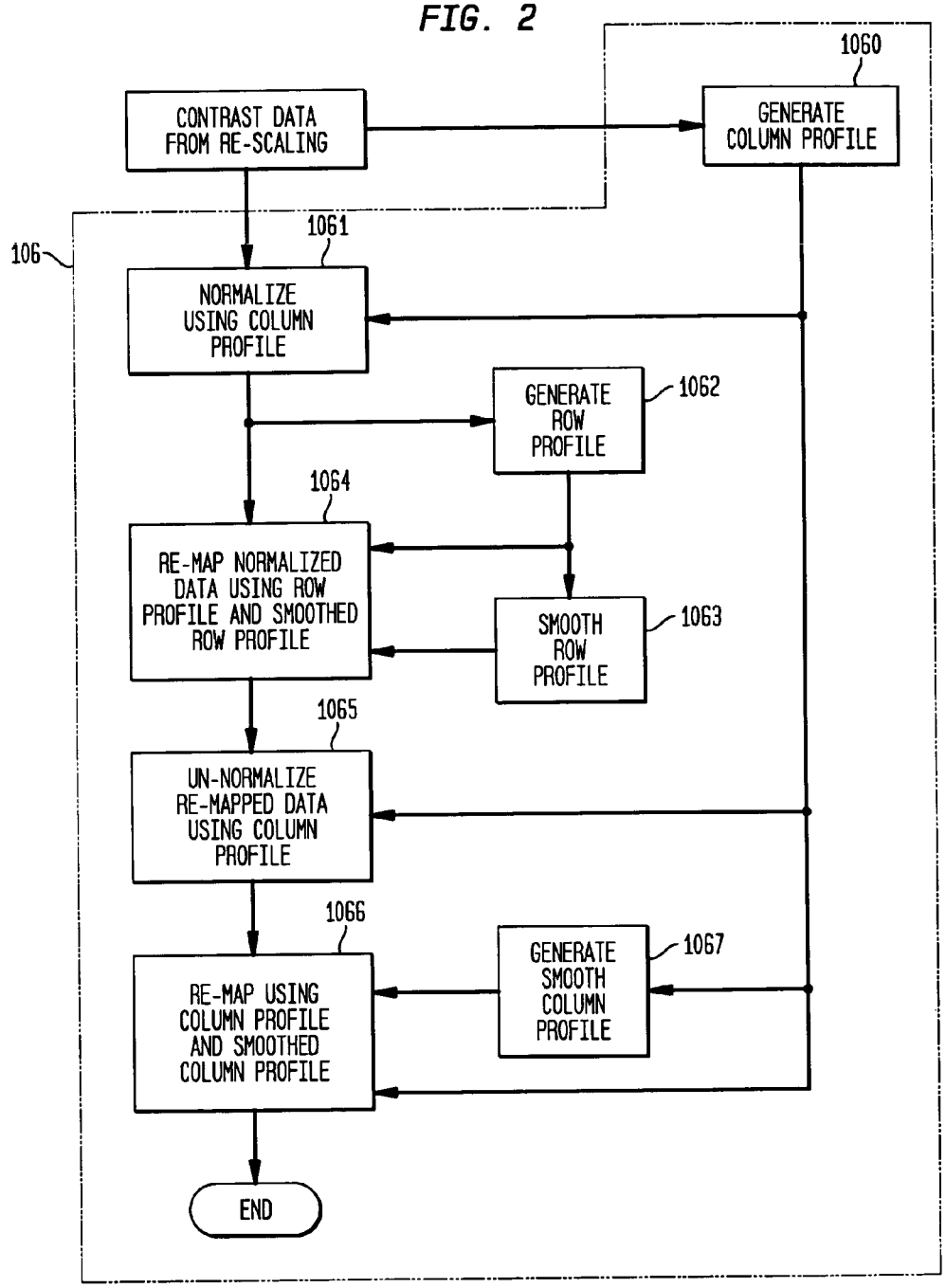
FIG. 2 is a flow diagram of the steps used in the present invention to correct the contrast data for jitter and CCD array effects.

Referring now to FIG. 2, the details of step 106 (i.e., modification of contrast data to correct for jitter and CCD array effects) are shown in the form of a flow diagram. The re-scaled contrast data output from step 104 is used as the input for step 106 contained within the dashed line region in FIG. 2. Specifically, a column profile is generated at step 1060 from the output of step 104. As described above in the "Background of Invention", a "column profile" is an array of values with each value in the array being a (computed) average intensity along a column of the pixels of data of an input image, i.e., the image/data output from step 104 in this case. The generated column profile is then used at step 1061 to normalize the data output from step 104. Since contrast data is defined in terms of ratios, normalization is achieved by dividing the output from step 104 by the column profile. This operation linearizes or "flat fields" the contrast image/data generated at step 104.

The normalized data generated at step 1061 is next used as the basis for generating a row profile at step 1062. The structure of a row profile is analogous to that of a column profile except that the average intensity values are computed along rows as opposed to columns. The row profile is smoothed at step 1063 by, for example, the application of a moving window smoothing routine. For instance, for an 11-pixel moving window, each k-th pixel is replaced by the average of the 11 pixels from (k−5) to (k+5). This gives the k-th pixel an average local intensity and smoothes out any local irregularities or sudden changes.

The row profile and smoothed row profile are used at step 1064 to re-map the normalized image from step 1061. More specifically, each pixel of data from the step 1061 normalized data is multiplied by the smoothed row profile (step 1063) and then divided by the row profile (step 1062). This re-mapped data is then normalized at step 1065 using the column profile from step 1060, i.e., the re-mapped data is multiplied by the column profile. The output of step 1065 is contrast image/data that has been corrected for jitter effects.

The jitter-corrected output from step 1065 is further corrected in terms of CCD array effects. Specifically, the output from step 1065 is re-mapped at step 1066 using both the column profile (from step 1060) and a smoothed column profile generated at step 1067. The column profile is smoothed at step 1067 by, for example, the application of a moving window smoothing routine such as that described above. The re-mapped image/data output from 1066 is the contrast data corrected for both jitter CCD array effects.

Figure 3:
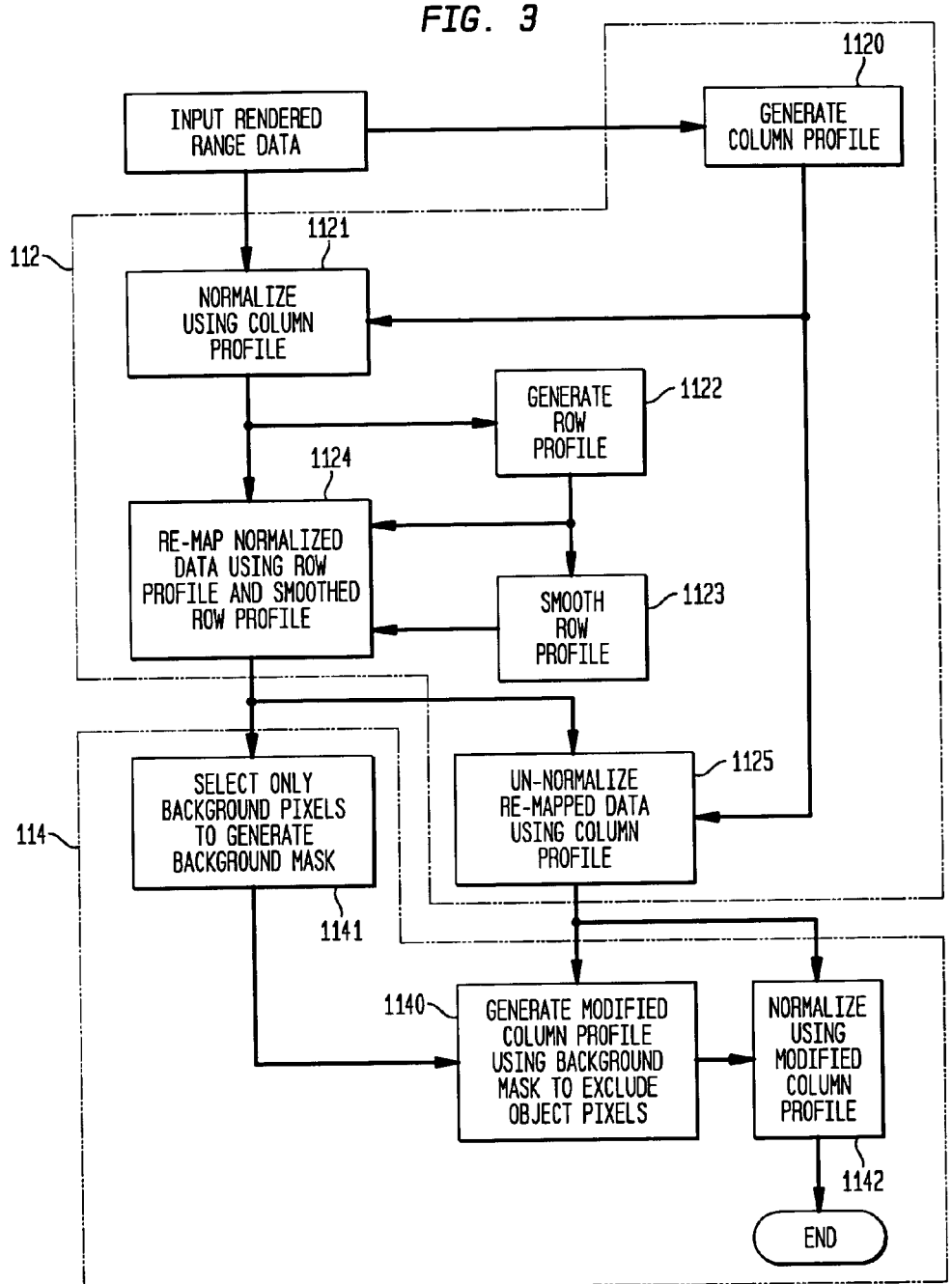
FIG. 3 is a flow diagram of the steps used in the present invention to correct the range data for jitter and CCD array effects.

Referring now to FIG. 3, the details of steps 112 and 114 (i.e., modification of range data to correct for jitter and CCD array effects) are shown in the form of a flow diagram. The two-dimensional rendered range data provided at step 100 is used as the input for step 112 contained within the corresponding referenced dashed-line region. Outputs from step 112 are used as inputs for step 114 contained within the correspondingly-referenced dashed-line region.

With respect to jitter correction of rendered range data, a column profile is generated at step 1120 and is then used at step 1121 to normalize the rendered range data. Since range has linear properties, normalization thereof involves addition. In this case, normalization in step 1121 involves addition of the rendered range data and the column profile. The method of computing the column profile is the same as described above except that it is based on range data. The normalized data generated at step 1121 is next used as the basis for generating a row profile at step 1122 which, in turn, is used as the basis for generating a smoothed row profile at step 1123. The method of computing the row profile and smoothed row profile is the same as described above.

The row profile and smoothed row profile are used at step 1124 to re-map the normalized image from step 1121. For range data, each pixel of data from the step 1121 normalized data has the smoothed row profile (step 1123) added thereto with the resulting sum having the row profile (step 1122) subtracted therefrom. This re-mapped data is then un-normalized at step 1125 using the column profile from step 1120, i.e., the re-mapped data has the column profile subtracted therefrom. The output of step 1125 is range image/data that has been corrected for jitter effects.

The method of the present invention simultaneously corrects for both CCD array effects and intensity roll-off in the range data at step 114. Specifically, the jitter-corrected output from step 1125 is used at step 1140 to generate a modified column profile using only pixels of data indicative of background. This is accomplished by generating a background mask at step 1141 using the re-mapped normalized data output from step 1124. That is, the pixels of data output from step 1124 are evaluated and only pixels of data indicative of background are used to form the background mask. By excluding pixels of data indicative of high-contrast objects, shadowing effects about an object (brought on by normalization) are reduced or eliminated.

The modified column profile is used to normalize (at step 1142) the range data output from step 1125. Normalization here involves adding the modified column profile to the range data output from step 1125. The resulting output of step 1142 is jitter-corrected range data that has been further corrected for CCD array effects and intensity roll-off.

As mentioned above, correcting for contrast intensity roll-off at step 110 involves the use of an exponential decay function that describes the roll-off curve, i.e., a bell-shaped curve. By way of illustrative example, one such decay function will now be described for use with a STIL system that uses two cameras where the first camera images the left half of a full image and the second camera images the right half of a full image. In general, contrast intensity roll-off correction is accomplished using a least squares fit of an exponential decay function on the contrast image profile for a camera. Using the coefficients with the least prominent exponential decay, both cameras are corrected by normalizing the contrast image columns with the exponential fit (using division). The least prominent coefficient exponential fit is used to reduce the chance of unwanted artifact effects from high contrast objects within the image block that may contribute to an artificially high exponential decay fit.

One suitable exponential decay function is defined as $$F_{EXP}(x) = A \times \exp[-K(x-x_0)^2]$$

where $x_0$ is half the total column width of the display device being used, and the parameters A and K are determined by least squared error technique on the image column profiles. This is accomplished by computing parameters $A_L$ and $K_L$ for the left camera using the first half of the image/data columns, and computing parameters $A_R$ and $K_R$ for the right camera using the second half of the image/data columns. The final exponential decay fit used to correct the intensity roll-off is $K=\min(K_L, K_R)$, and the parameter A corresponds to an associated $A_L$ or $A_R$. The parameters A and K are determined through the application of a least squares error method to the equation given above. The parameter A is a nominal amplitude and the parameter K represents the degree of exponential decay.

The STIL system camera(s) can be the source of several inherent effects/defects. These effects/defects include:

(i) columns of the image that are "dead" (i.e., no photon information collected with the resulting image of the column appearing as a black vertical band);

(ii) the two (or more) cameras of the STIL system operating under different power settings resulting in different background intensities for each camera; and (iii) overlapping of adjoining fields-of-view between adjacent cameras.

In the present invention, corrections of the first two of these effects are performed on the rendered contrast data and rendered range data provided at step 100 (FIG. 1), and correction of the third effect is performed subsequent to the histogram clip routine applied at step 120. While processing to correct these effects is well understood in the art, brief descriptions thereof will be provided herein.

Figure 4:
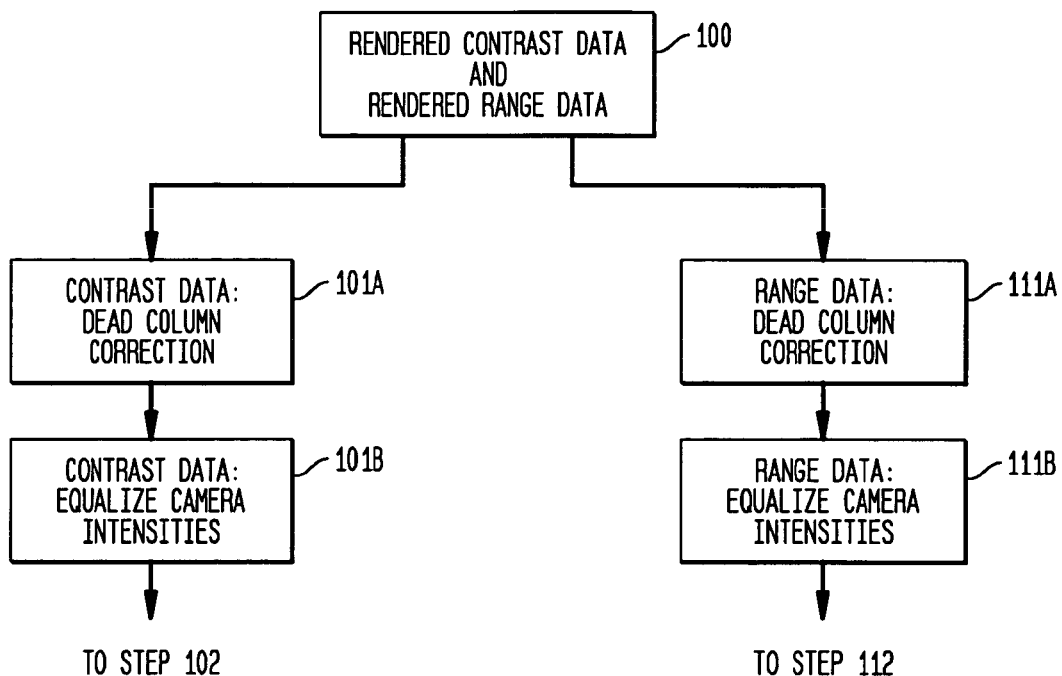
FIG. 4 is a flow diagram illustrating pre-processing steps to correct for dead columns and unequal camera intensities.

With respect to the correction of "dead" columns and unequal camera power settings, reference will now be made to the flow diagram of FIG. 4 which illustrates just the pre-processing correction steps that can be used prior to the enhancement method described above. Dead columns of data in the rendered contrast data are corrected at step 101A and dead columns of the range data are corrected at step 11A. As is known in the art of image processing, the dead columns are "filled" with intensity values that are the average of the columns on either side of a dead column.

The corrected data/images from steps 101A and 111A are respectively supplied to steps 101B and 111B where camera intensities between the STIL system's cameras are equalized. This can be accomplished as follows. Assume, for example, that the entire image is 1024 columns with the first 512 columns being the field-of-view of a left camera and the second 512 columns being the field-of-view of a right camera. At step 101B, the contrast image block has its camera intensities equalized by multiplying the first 512 columns (left camera) by the average mean contrast intensity of both cameras and dividing by the mean contrast intensity of the left camera, and then multiplying the second 512 columns (right camera) by the average mean contrast intensity of the two cameras and dividing by the mean contrast intensity of the right camera. At step 111B, the range image block has its camera intensities equalized by adding to the first 512 columns (left camera) the average mean range intensity of both cameras and subtracting the mean range intensity of the left camera, and then adding to the second 512 columns (right camera) the average mean of the two cameras and subtracting the mean of the second camera. The outputs from steps 101B and 111B serve as the inputs for previously-described steps 102 and 112, respectively.

Figure 5:
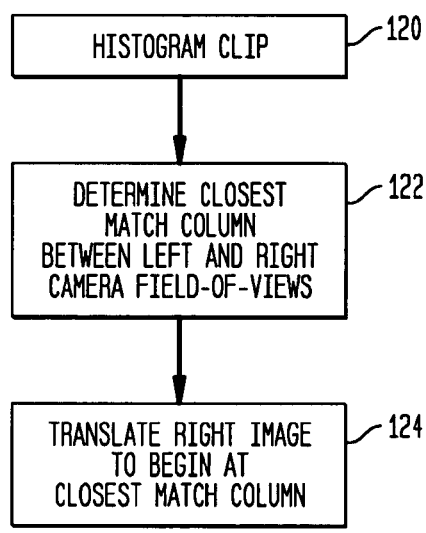
FIG. 5 is a flow diagram illustrating the processing steps used to correct for camera overlap.

With respect to correction of camera overlap, FIG. 5 illustrates processing steps that can be used to correct for camera overlap for each of the contrast data and range data sets. That is, the same steps are independently applied to each data set. At step 122, the last (or rightmost) column of the left camera's data is compared to the first few (or leftmost) columns of the right camera's data to find the column from the right camera's data that most closely matches (e.g., in a mean square error sense) the last column of the left camera's data. Then, at step 124, the column that defines the closest match is translated to become the first (or leftmost) column in the right camera's data.

The advantages of the present invention are numerous. Contrast and range data enhancement of STIL data is improved as shadowing effects are greatly reduced or eliminated. Saturation of range data is virtually eliminated as object pixels are masked off during the CCD array effect correction. The entire process is a sequential process that lends itself to full automation.

Although the present invention has been described for the enhancement of both contrast range data, the method could be segmented to provide either just contrast data enhancement or just range data enhancement. Specifically, enhancement of only contrast data can be accomplished by performing steps 102, 104, 106, 108, 110 and 120 with steps 101A, 101B, 122 and 124 being additionally performed if a two-camera STIL system is used to generate the original contrast data. In a similar fashion, enhancement of only range data can be accomplished by performing steps 112, 114, 116 and 120 with steps 111A, 111B, 122 and 124 being additionally performed if a two-camera STIL system is used to generate the original range data.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of enhancing two-dimensional contrast and range images rendered from three-dimensional streak tube imaging lidar (STIL) data that is generated by a STIL camera system, comprising the steps of:
    providing rendered contrast image data, wherein said rendered contrast image data comprises pixels of data that comprise an image;
    scaling an intensity value associated with each pixel of data in said rendered contrast image data based on a mean intensity value of all pixels of data in said rendered contrast image data, wherein first interim contrast image data is created;
    re-scaling said first interim contrast image data to a predetermined dynamic range, wherein second interim contrast image data is created;
    modifying said second interim contrast image data to compensate for jitter and charge coupled device (CCD) array effects associated with the STIL camera system, wherein third interim contrast image data is created;
    re-scaling said third interim contrast image data to said predetermined dynamic range, wherein fourth interim contrast image data is created;
    normalizing said fourth interim contrast image data using an exponential decay function that describes contrast intensity roll-off associated with said fourth interim contrast image data, wherein fifth interim contrast image data is created; and
    applying a histogram clip routine to said fifth interim contrast image data, wherein enhanced contrast image data is created.

2. A method according to claim 1 wherein said step of scaling comprises the step of applying a $\log_{10}$ scaling routine to each pixel of data in said rendered contrast image data.

3. A method according to claim 1 wherein each said step of re-scaling comprises a linear operation.

4. A method according to claim 1 wherein said step of modifying said second interim contrast image data comprises the steps of:
    generating a column profile from said second interim contrast image data, said column profile defined as an array of values with each one thereof being an average intensity taken along a column of pixels of data from said second interim contrast image data;
    normalizing said second interim contrast image data using said column profile, wherein normalized image data is created;
    generating a row profile from said normalized image data, said row profile defined as an array of values with each one thereof being an average intensity taken along a row of pixels of data from said normalized image data;
    applying a first smoothing routine to said row profile, wherein a smoothed row profile is created;
    generating smoothed image data by multiplying said normalized image data by said smoothed row profile and then dividing by said row profile;
    un-normalizing said smoothed image data using said column profile, wherein un-normalized image data is created;
    applying a second smoothing routine to said column profile, wherein a smoothed column profile is created; and
    generating said third interim contrast image data by multiplying said un-normalized image data by said smoothed column profile and then dividing by said column profile.

5. A method according to claim 1 wherein said histogram clip routine is an adaptive scheme that adjusts clipping thresholds based on pixel intensity distribution of said fifth interim contrast image data.

6. A method of enhancing two-dimensional contrast images rendered from three-dimensional streak tube imaging lidar (STIL) data that is generated by a STIL camera system that utilizes left and right cameras to generate the STIL data, comprising the steps of:
    providing rendered contrast image data generated from the STIL data, wherein said rendered contrast image data comprises pixels of data that comprise an image;
    adjusting said rendered contrast image data to account for (i) missing columns of pixels of data due to defects in the left and right cameras, and (ii) differences in image background intensity between images generated by the left and right cameras due to differences between the left and right cameras, wherein equalized contrast image data is created;
    scaling an intensity value associated with each pixel of data in said equalized contrast image data based on a mean intensity value of all pixels of data in said equalized contrast image data, wherein first interim contrast image data is created;

re-scaling said first interim contrast image data to a predetermined dynamic range, wherein second interim contrast image data is created;

modifying said second interim contrast image data to compensate for jitter and charge coupled device (CCD) array effects associated with the STIL camera system, wherein third interim contrast image data is created;

re-scaling said third interim contrast image data to said predetermined dynamic range, wherein fourth interim contrast image data is created;

normalizing said fourth interim contrast image data using an exponential decay function that describes contrast intensity roll-off associated with said fourth interim contrast image data, wherein fifth interim contrast image data is created;

applying a histogram clip routine to said fifth interim contrast image data, wherein enhanced contrast image data is created; and applying an overlap correction routine to said enhanced contrast image data to eliminate columns of pixels of data indicative of an overlapping field-of-view between the left and right cameras.

7. A method according to claim 6 wherein said step of scaling comprises the step of applying a $\log_{10}$ scaling routine to each pixel of data in said rendered contrast image data.

8. A method according to claim 6 wherein each said step of re-scaling comprises a linear operation.

9. A method according to claim 6 wherein said step of modifying said second interim contrast image data comprises the steps of:

generating a column profile from said second interim contrast image data, said column profile defined as an array of values with each one thereof being an average intensity taken along a column of pixels of data from said second interim contrast image data;

normalizing said second interim contrast image data using said column profile, wherein normalized image data is created;

generating a row profile from said normalized image data, said row profile defined as an array of values with each one thereof being an average intensity taken along a row of pixels of data from said normalized image data;

applying a first smoothing routine to said row profile, wherein a smoothed row profile is created;

generating smoothed image data by multiplying said normalized image data by said smoothed row profile and then dividing by said row profile;

un-normalizing said smoothed image data using said column profile, wherein un-normalized image data is created;

applying a second smoothing routine to said column profile, wherein a smoothed column profile is created; and generating said third interim contrast image data by multiplying said un-normalized image data by said smoothed column profile and then dividing by said column profile.

10. A method according to claim 6 wherein said histogram clip routine is an adaptive scheme that adjusts clipping thresholds based on pixel intensity distribution of said fifth interim contrast image data.

* * * * *